United States Patent [19]

Dastolfo, Jr. et al.

[11] Patent Number: 4,943,426
[45] Date of Patent: Jul. 24, 1990

[54] METHOD FOR REGULATING REACTION TEMPERATURE

[75] Inventors: LeRoy E. Dastolfo, Jr., Lower Burrell; Vito Cedro, III., Export, both of Pa.

[73] Assignee: Aluminum Company of America, Pittsburgh, Pa.

[21] Appl. No.: 208,657

[22] Filed: Jun. 20, 1988

[51] Int. Cl.$^5$ .............................................. C01F 5/32
[52] U.S. Cl. .................................... 423/497; 423/498; 423/DIG. 12
[58] Field of Search ............... 423/498, 497, DIG. 12, 423/DIG. 6; 260/544 K

[56] References Cited

U.S. PATENT DOCUMENTS

| 1,875,105 | 8/1932 | Muggleton et al. | 423/497 |
| 1,943,920 | 1/1934 | Lacell | 204/19 |
| 2,355,367 | 8/1944 | Cooper | 423/498 |
| 4,190,639 | 2/1980 | Tsao | 260/544 K |
| 4,210,631 | 7/1980 | DeLue et al. | 423/292 |
| 4,215,013 | 7/1980 | Loontjens | 252/429 B |
| 4,264,569 | 4/1981 | Sinha | 423/495 |
| 4,269,816 | 5/1981 | Shackleton et al. | 423/498 |
| 4,302,433 | 11/1981 | Stein | 423/498 |
| 4,478,600 | 10/1984 | Schoener et al. | 23/313 FB |
| 4,487,747 | 12/1984 | Robinson et al. | 423/60 |

FOREIGN PATENT DOCUMENTS

| 502646 | 11/1930 | Fed. Rep. of Germany | 423/498 |
| 1109156 | 5/1959 | Fed. Rep. of Germany | 423/498 |
| 2311213 | 7/1974 | Fed. Rep. of Germany | . |
| 718773 | 11/1954 | United Kingdom | . |
| 2187444 | 9/1987 | United Kingdom | 423/574 R |

OTHER PUBLICATIONS

Greenwood & Earnshaw, Chemistry of the Elements; Pergamon Press, 1984, p. 324.
"Electrolytic Production of Magnesium", Kh. L. Strelets, Moscow, 1972, Translated for National Science Foundation-1977.
"The Production of Anhydrous Aluminum Chloride from Alumina in a Fluidised Bed", Dr. Joseph Hille & Dr. Wolfgang Dürrwächter, Angew. Chem. Internat. Edit./Sample Issue, No. 0, May 1961.
"Kinetics of $\gamma$-Alumina Chlorination by Carbon Monoxide and Chlorine", A. Toth et al., Thermochimica Acta, 52(1982), 211-215.

Primary Examiner—Jeffrey E. Russel
Assistant Examiner—Brian M. Bolam
Attorney, Agent, or Firm—Gary P. Topolosky

[57] ABSTRACT

A method for regulating the temperature at which two or more substances combine to form end product in the reactor, at least one of said substances produced from two or more reactants in the reactor, said method comprising: combining at least some of the reactants in a vessel thermally isolated from the reactor to produce substance in the vessel; and transferring substance from said vessel to the reactor. The invention constitutes an improved method for producing magnesium chloride by heating magnesium carbonate in packed bed reactor; passing carbon monoxide and chlorine gas through the packed bed; and withdrawing carbon dioxide from above the packed bed and molten magnesium chloride from below said bed. This improvement consists essentially of reacting at least some carbon monoxide and chlorine in a continuously-cooled vessel to form phosgene; and substituting a sufficient amount of phosgene from the vessel for the carbon monoxide and chlorine gas otherwise passed through said packed bed.

5 Claims, 2 Drawing Sheets

TE = TEMPERATURE ELEMENT
TC = TEMPERATURE CONTROLLER

FIG.1 – PRIOR ART

METHOD FOR REGULATING REACTION TEMPERATURE

BACKGROUND OF THE INVENTION

1. Field of the Invention

This invention relates to a method for regulating at least one parameter in a reactor used to chemically produce end product from two or more substances. The invention further relates to means for controlling the temperature at which a chlorinating agent and reducing agent react with metal compound to form metal chloride in a reactor. The invention represents an improved method for producing magnesium chloride from magnesium oxide-containing compounds, including magnesite.

2. Technology Review

In U.S. Pat. No. 4,269,816, the disclosure of which is incorporated herein by reference, there is claimed a process for preparing magnesium chloride from magnesium carbonate, carbon monoxide and gaseous chlorine. The process commences by heating pieces of magnesium carbonate in a packed bed reactor to a temperature above the melting point of magnesium chloride and below about 1200° C. The heated magnesium carbonate pieces of this packed bed are then reacted with gaseous chlorine in the presence of carbon monoxide. Carbon dioxide is then withdrawn from above the bed while molten anhydrous magnesium chloride is withdrawn from below said packed bed. The temperature of reaction within the foregoing reactor is typically maintained between about 800–1000° C. At such high temperatures, some of the magnesium chloride that forms vaporizes. When offgases are removed from this reactor, vaporized end product (magnesium chloride) escapes thus lowering process efficiency.

When a metal oxide is converted to metal chloride, the heat produced from this exothermic reaction provides much of the energy needed to maintain the reactor at a desired temperature. If too much heat is present, active cooling means must be employed to prevent excessive losses due to end product vaporization. Various mechanisms have been employed for externally cooling reactor vessels of this sort. The most straightforward external cooling means consists of immersing the reactor or constantly pouring liquid coolant, such as water, over the same. This type of cooling means does not provide means for proceeding at various temperatures, however. The extent of cooling is also dependent upon the type of liquid coolant used, overall reactor size and shape, and the temperature of reaction within said reactor.

Modifications in reactor vessel size are another alternative means for controlling temperature within a reaction vessel. Increasing the total height of a given reactor area may improve thermal conductivity but at increased construction and/or operation costs. Decreases in vessel liner thicknesses are also possible. Thinner liners would tend to place greater temperature strains on the external shell of said reactor vessel. Finally, temperature control means may also be achieved by purposefully recycling at least some portion of cooled end product back into the system. The latter approach reduces process efficiency by sacrificing already formed end product for greater reaction temperature control.

The present invention has determined that the temperature of reaction in an exothermic chlorination reactor can be controlled by pre-reacting at least some portion of the feed gases outside of the main reaction zone. When chlorine is the preferred chlorinating agent and carbon monoxide the preferred reducing agent, these two gases may be combined externally to form phosgene. The heat of reaction associated with phosgene formation is then absorbed in its own continuously-cooled vessel before phosgene is directly introduced into the main reaction zone. When the amounts of chlorine and carbon monoxide diverted from the main reactor for preconversion are purposefully varied, the overall temperature of reaction within said vessel may be more variably adjusted or controlled. This invention also significantly lowers offgas temperature within the main reactor.

In British Patent Specification No. 718,773, a method for converting aluminum oxide to aluminum chloride was proposed which included mixing together equal volumes of carbon monoxide and chlorine. The resulting phosgene was then fed, without cooling, into the main reactor vessel. In this manner, the aluminum chloride production method of British Patent Specification No. 718,773 made use of hot phosgene (and the heat set free by combining carbon monoxide and chlorine) to enhance reaction efficiency. In more preferred embodiments, hot phosgene was fed into the main chamber of this aluminum chloride reactor at about 500° C. for promoting a total reaction temperature between about 500–800° C. therein.

SUMMARY OF THE INVENTION

It is a principal object of the present invention to provide means for regulating the temperature of reaction in a reactor for forming end product from two or more substances.

It is a further object to provide means for removing some of the heat generated by exothermally producing an intermediate compound from two or more reactants, said intermediate compound being reacted with another substance to form the desired end product therefrom.

It is still a further object of this invention to provide an effective, low-cost control mechanism for achieving variable heat removal from a reaction vessel used to convert metal oxides to metal chlorides. It is especially desired to achieve this result over a wide range of flow rates and operating temperatures without substantial modification to vessel size and/or shape and without detrimentally affecting metal chloride production rates. It is a further object, therefore, to provide means for maintaining the reaction zone temperature of a packed bed at the minimum level needed for high yields of end product.

In accordance with the foregoing objects and advantages, there is provided a method for regulating the temperature at which two or more substances combine to form end product in a reactor, at least one of said substances produced by combining two or more reactants within the reactor. This method comprises combining at least some of the reactants in a vessel thermally isolated from the reactor to produce substance in the vessel; and transferring at least some of said substance from the vessel to the main reactor. In another embodiment, there is disclosed a method for controlling the temperature at which a chlorinating agent and reducing agent react with metal compound to form metal chloride in a reactor. This method comprises: (a) combining at least some clorinating agent and some reducing agent to form an intermediate reactant in a continuously-cooled vessel removed from the main reactor; and (b) varying the amount of intermediate reactant transferred from the vessel to the reactor. In still further embodiments, there is disclosed a method for lowering the offgas temperature in a reactor for producing magnesium chloride from magnesium carbonate, carbon monoxide and chlorine. This method includes diverting at least some carbon monoxide and chlorine from the reactor to a continuously-cooled vessel; combining the carbon monoxide and chlorine in this vessel to exothermally produce phosgene; continuously cooling said vessel; and transferring phosgene from said vessel to the reactor containing magnesium carbonate. With the foregoing method, offgas temperatures are effectively lowered to between about 200–650° C., or more preferably to below about 400° C.

In view of the foregoing objects and advantages, it is clear that the present invention represents a significant improvement to the method for producing magnesium chloride in U.S. Pat. No. 4,269,816. The particular improvement to this method comprises reacting (or prereacting) at least some carbon monoxide and chlorine in a continuously-cooled vessel to form phosgene; and substituting a sufficient amount of this phosgene for the carbon monoxide and chlorine gas otherwise passed through the packed bed of heated magnesium carbonate pieces therein.

DETAILED DESCRIPTION OF THE PREFERRED EMBODIMENTS

In the description of the preferred embodiments which follows, repeated reference is made to the production of magnesium chloride by reacting magnesium carbonate (or other oxidic magnesium product) with chlorine, carbon monoxide and/or phosgene. It is to be understood, however, that the present invention is also applicable to other exothermic chlorination reaction systems, including those involving oxides and/or carbonates of alkali metals, alkaline earth metals, transition metals and group IIIA elements. Reference is also made to combining two or more substances within the main reactor. In preferred embodiments, the reacting substances are both compounds. It is to be understood, however, that at least one of said substances may consist essentially of a single element.

This invention provides an improved process for making magnesium chloride in a reactor wherein solid magnesium carbonate pieces are combined with chlorine gas in the presence of carbon monoxide. In such a reactor, carbon dioxide is continuously withdrawn from above a packed bed of magnesium carbonate within said reactor while molten magnesium chloride is withdrawn from below the packed bed. In this type of reactor, solid magnesium carbonate pieces are typically fed continuously from the top of the reactor while gaseous chlorine and carbon monoxide are introduced from the bottom (or in a direction countercurrent to the magnesium chloride produced and withdrawn). Use of such feed directions in this type of reactor insures good solid/gas contact while permitting end product to freely flow away from remaining solid compound reactants. On a preferred basis, the packed bed of this reactor consists essentially of only magnesium carbonate material. It may also contain other inert materials which do not take part in the basic reaction, however.

Figure 1:
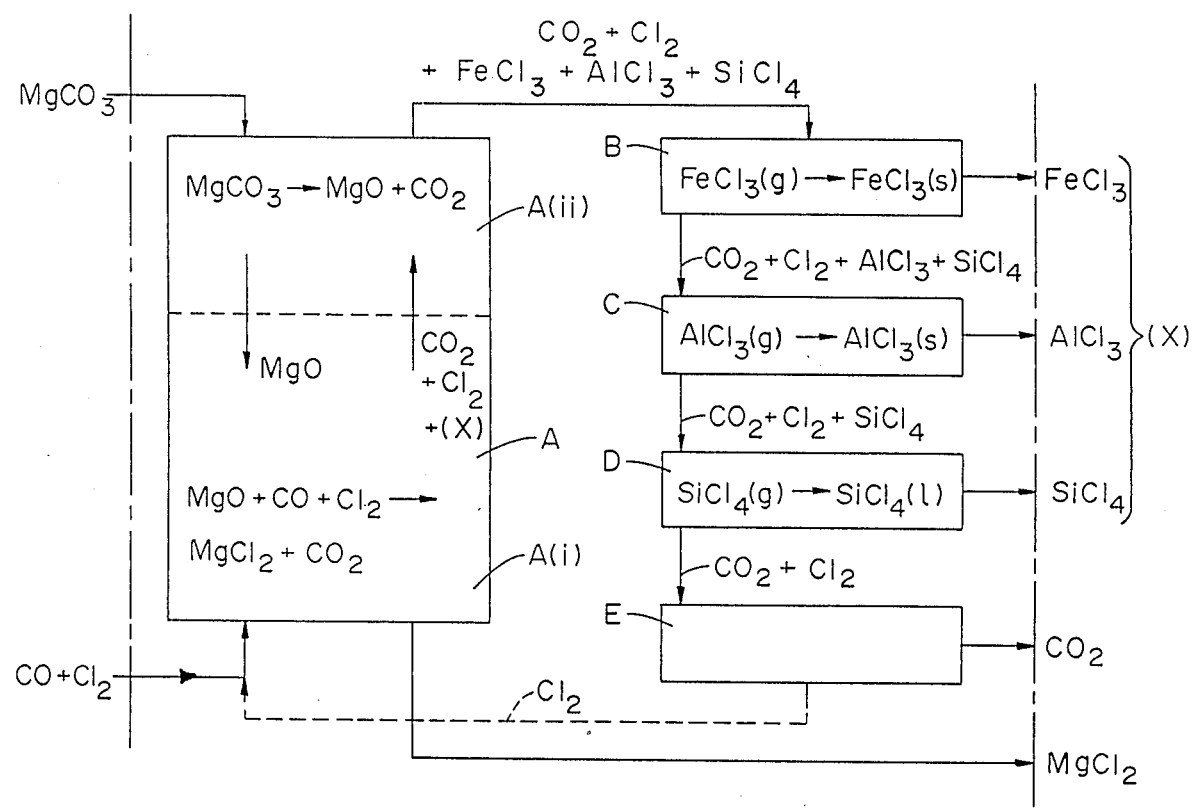
FIG. 1 is a prior art flow diagram of the process shown and described in U.S. Pat. No. 4,269,816.

Referring now to FIG. 1, there is shown a flow sheet of the prior art system disclosed in U.S. Pat. No. 4,269,816. Inputs to this system are given in the left-hand column while all outputs are shown on the right-hand side of FIG. 1. The feed material into this reactor comprises pieces of magnesite (or magnesium carbonate plus impurities). The aforementioned feed material is delivered to the top of reactor A having two distinct zones: the carbochlorination zone A(i) through which carbon monoxide and chlorine gas are fed countercurrent to the direction from which molten magnesium chloride is tapped from the reactor; and magnesite preheating zone A(ii) provided at the top of packed bed reactor A. According to the earlier disclosed process, magnesite is first preheated and calcined by hot offgases flowing upwardly from the carbochlorination zone A(i). These offgases consist almost entirely of carbon dioxide, though some amounts of unreacted chlorine and other minor chlorides may also be contained therein, said other chlorides represented by the symbol (X) in the flow sheet at FIG. 1. Typical minor chlorides found in the offgas from this reactor include $FeCl_3$, $AlCl_3$ and $SiCl_4$. Small quantities of carbon monoxide, chlorine and vaporized magnesium chloride may also be present depending upon overall reactor efficiency. Hydrogen chloride is also found in these offgases, being formed from hydrogen gas of moisture in the feed gas and moisture present in the ore fed to the reactor.

The temperature within prior art preheating zone A(ii) must be maintained sufficiently high for allowing minor chlorides to pass through in the vapor state. In the reaction system of FIG. 1, effluent gases from preheating zone A(ii) are then routed through a series of condensers (B, C and D) maintained at progressively lower temperatures in order to successively condense $FeCl_3$, $AlCl_3$ and $SiCl_4$, repectively. Residual (or unreacted) chlorine and other noxious gases are then removed from this stream at E while remaining effluent, carbon dioxide, is vented into the atmosphere.

Figure 2:
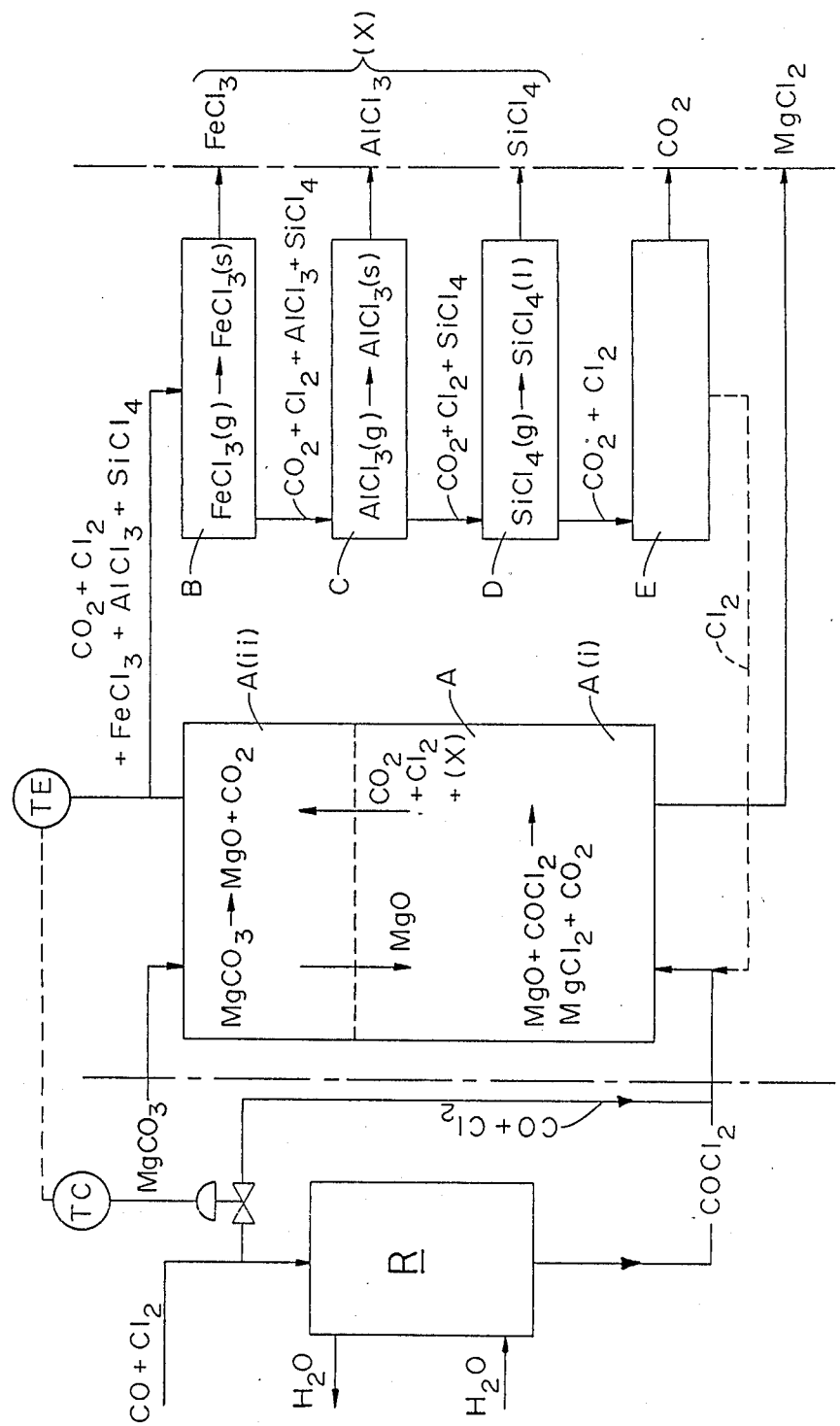
FIG. 2 is a revised version of FIG. 1 to which has been added the novel improvements of the present invention.

Now referring to FIG. 2, the temperature control system of this invention is shown on the left-hand side wherein R is a liquid-cooled reaction vessel and TC is a temperature controller for regulating the amount of feed gases diverted into reaction vessel R to achieve the desired offgas temperature in main reactor A. In the reactor vessel R shown in FIG. 2, cooling water is fed into the bottom of a surrounding shell (or series of tubes) and circulated throughout said shell (or tubes) for removing the heat of reaction within reactor vessel R before being allowed to exit at the top of said shell (or end of said tubes). It is to be understood that other liquid coolants may also be substituted for the water within reactor vessel R. The heat of reaction associated with exothermally producing phosgene from carbon monoxide and chlorine gas may also be absorbed by any other known or subsequently developed cooling means.

Within reactor vessel R, both feed gases are brought together over a catalyst surface. In the presence of activated carbon, for example, chlorine and carbon monoxide react to form phosgene. It is to be understood, however, that other known catalytic materials may also be charged into a reactor vessel for preconverting these two feed gases into the desired intermediate reactant, phosgene.

Depending upon which offgas temperature is desired within main reactor A, most, if not all chlorine and carbon monoxide can be diverted from the reactor and directly to reaction vessel R. In a more general operating mode, at least some chlorine and/or carbon monoxide is bypassed around reaction vessel R for feeding directly into main reactor A. Temperature element TE measures the reaction temperature within preheating zone A(ii) of main reactor A. Data from temperature element TE is then fed directly to temperature controller TC for purposefully varying the amount of gaseous reactants combined to form phosgene in reaction vessel R and controlling the overall reaction temperature therein.

Within the prior art reactor of U.S. Pat. No. 4,269,816, chlorination typically proceeds according to the following formula:

$$MgCO_3 + CO + Cl_2 \rightarrow MgCl_2(l) + 2CO_2 \quad (1).$$

At 298° K., the above chlorination reaction releases $-38.987$ kcal/gmol. When magnesium chloride is tapped from this prior art reactor at 800° C. and carbon dioxide offgases exit at about 250° C., the net heat of reaction within reactor A of FIG. 1 is $-23.276$ kcal/gmol. As such, this prior art mechanism is clearly hot enough to necessitate the addition of an active cooling system.

With preformation or preconversion of phosgene according to the present invention, the following chlorination reaction becomes significant (or even dominant depending upon the relative amount of CO, $Cl_2$ and $COCl_2$ fed to the reactor):

$$MgCO_3 + COCl_2 \rightarrow MgCl_2(l) + 2CO_2 \quad (2).$$

At 298° K., the foregoing reaction of magnesium carbonate with phosgene has a lower heat of reaction of $-13.587$ kcal/gmol. Using the same product and offgas temperatures as mentioned above for the prior art reactor, the net heat of reaction for the present system becomes slightly endothermic, requiring only about $+2.124$ kcal/gmol. Therefore, by varying the amount of magnesium chloride produced from reacting magnesium carbonate with phosgene, the net heat of reaction can be changed from strongly exothermic to slightly endothermic.

In the conventional magnesium carbochlorination technology taught by K. L. Strelets in "Electrolytic Production of Magnesium", United States-Israel Binational Science Foundation (1977), solid carbon reductant is briquetted with magnesium oxide/carbonate feeds and magnesium chloride. The chlorination zone for this reaction is kept around 850–1100° C. while reactor offgases should not exceed 250° C. According to Strelets, higher reaction temperatures will allow larger amounts of $MgCl_2$ to be lost to the offgases. In order to maintain the $MgCl_2$ of this particular reactor at temperatures of about 750–800° C., electric heaters are circulated throughout the reactor bottom. Such temperature requirements, for the most part, are valid for other existing chlorination technology, including the prior art system shown in U.S. Pat. No. 4,269,816.

Using a computer model of the $MgCl_2$ reactor from U.S. Pat. No. 4,269,816, phosgene conversion within its own continuously-cooled vessel was shown to be a powerful tool for regulating (or lowering) offgas temperatures. When only 35% of the amounts of chlorine and carbon monoxide otherwise fed to this model reactor was preconverted to phosgene, overall offgas temperatures were reduced from 492° C. to 246° C. When some of the same feed gases were fed to a different area of this reactor, 60% phosgene preconversion reduced offgas temperatures from 606° C. to 258° C. Depending upon what ratios of carbon monoxide and chlorine are diverted to reactor vessel R, offgas temperatures within main reactor A may be lowered to at or below about 350° C. or 400° C., or more preferably to between about 200–300° C. Using this computer model, it has been determined that preconversion of at least some phosgene effectively reduces offgas temperatures greater than the combined effects of increasing the height of preheating zone A(ii), decreasing reactor wall thickness and continuously dousing the external shell of main reactor A with cooling water. By combining carbon monoxide and chlorine to form phosgene in a separate vessel removed from main reactor A, reaction temperatures may be controlled to any desired level depending upon the amount of gaseous reactants diverted to reaction vessel R or fed directly to reactor A. Such control clearly contrasts with the more fixed design control parameters mentioned above. As such, preformation or preconversion of phosgene within its own separately-cooled vessel avoids the need for substantially modifying reaction chamber designs, thus avoiding the significant capital improvement costs associated with some of the foregoing alternatives.

With the foregoing computer model, it was also determined that the carbochlorination and preheating zones of main reactor A act like a large heat pipe with magnesium chloride as the working fluid therein. Significant amounts of heat are piped upwards by vaporization of liquid $MgCl_2$ when the chlorination zone is hot enough. However, small differences in chlorination zone temperature have a marked effect on magnesium chloride vaporization/condensation rates. External phosgene formation reduces offgas temperatures by lowering the temperature within the chlorination zone of said reactor as much as about 45–60° C. Such temperature changes are substantial enough to reduce the aforementioned heat pipe effect while not adversely affecting reactivity of the packed bed within said reactor.

Having described the presently preferred embodiments, it is to be understood that the invention may be otherwise embodied within the scope of the appended claims hereto.

What is claimed is:

1. A method for lowering the offgas temperature in a reactor for producing magnesium chloride from magnesium carbonate, carbon monoxide and chlorine, said method comprising:
   (a) diverting at least some carbon monoxide and chlorine from the reactor to a continuously-cooled vessel;
   (b) combining the carbon monoxide and chlorine in said vessel to exothermally produce phosgene;
   (c) continuously cooling the vessel; and
   (d) transferring phosgene from said vessel to the reactor containing magnesium carbonate.

2. The method of claim 1 wherein the offgas temperature in said reactor is at or below about 400° C.

3. The method of claim 2 wherein the offgas temperature in said reactor is between about 200–300° C.

4. A method for controlling the temperature of a reactor in which metal chloride is formed from multiple components, said method comprising:
   (a) monitoring reactor temperature; and
   (b) selectively lowering or raising said temperature by:

(i) combining at least some components outside of the reactor to form a reactive intermediate;
(ii) cooling the reactive intermediate outside of the reactor; and
(iii) transferring reactive intermediate to the reactor for combining with another component to form metal chloride therefrom.

5. In a method for producing magnesium chloride by heating magnesium carbonate in a packed bed reactor to above the melting point for magnesium chloride and below about 1200° C.; passing carbon monoxide and chlorine through the packed bed of said reactor; withdrawing carbon dioxide from above the packed bed; and withdrawing molten magnesium chloride from below the packed bed, the improvement which comprises:

(a) reacting at least some carbon monoxide and chlorine in a continuously-cooled vessel to form phosgene; and
(b) substituting a sufficient amount of phosgene from said vessel for the carbon monoxide and chlorine otherwise passed through said packed bed.

* * * * *